Patented May 6, 1930

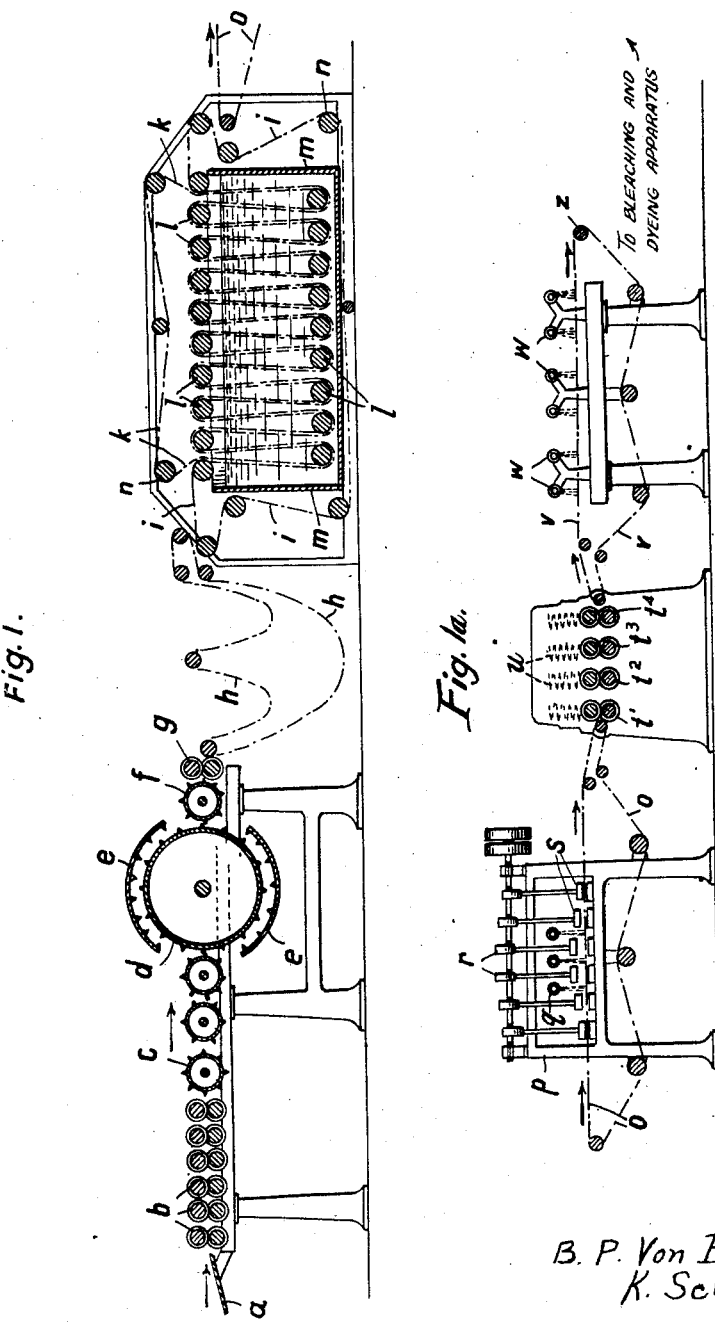

1,757,349

UNITED STATES PATENT OFFICE

BRUNO POSSANNER von EHRENTHAL, OF COTHEN, ANHALT, GERMANY, AND KARL SCHOLZ, OF TETSCHEN-ON-THE-ELBE, CZECHOSLOVAKIA

APPARATUS FOR EXTRACTING FIBERS FROM PLANT STALKS

Application filed June 29, 1926, Serial No. 119,465, and in South Africa July 1, 1925.

This invention relates in general to methods of extracting fibers from bast and from the stalks of flax and hemp plants and the like. An object of the invention is to provide a method by which linen fibers for example can be extracted in an efficient and very economical manner from flax plants that have been cultivated for their seed rather than their fiber. It is well known that the stalks of flax seed plants are generally destroyed on the field, because it has hitherto been impossible to extract the fibers from them in a satisfactory manner.

Another object of the invention is to simplify the extraction of linen fibers from flax plants that have been cultivated for their fiber. Hitherto it has been necessary to pull up such flax plants by the roots and to ret them. The present process enables such flax plants to be reaped with ordinary harvesting machines and to entirely eliminate the retting process.

A further advantage obtained by the novel process is that the dried stalks of the harvested plants may be simply fed into one end of a series of machines or apparatus. The finished fiber is delivered from the last machine or apparatus in the series without the intervention of any human agency.

A further advantage is that contrary to the linen fibers obtained by retting, the cottonized linen fibers obtained by the novel process can be dealt with in ordinary cotton spinning mills. The fibers of hemp and bast can also be cottonized by the novel process with the same apparatus or machines as are used for cottonizing flax.

By the method according to this invention the fibers are extracted from the plant stalks and separated into their elements, the length of the latter being approximately the same as that of cotton fibers. Therefore the present process may be described as a process for cottonizing bast fibers as for example the fibers of flax seed or hemp plants.

Attempts have previously been made to cottonize bast fibers but a drawback of the known processes is that several steps in them had to be carried out by hand and the repeated handling and packing of the fibrous material resulted in tangling of the fibers and unevenness of the same, in addition to the costs of labor rendering the process uneconomical.

A feature of our process is that all steps in the same are performed automatically there being no manual operations between these steps. The result of this procedure is that on the one hand the individual fibers of the extracted fibrous material all lie perfectly parallel to each other and have a certain length of staples, while on the other hand the process is rendered very profitable through the almost complete elimination of costs for manual labor.

Our novel process is illustrated in the accompanying drawing in which Figs. 1 and 1ª are the left and right hand portions of the complete machine or apparatus, the views being in vertical section. The drawing shows all the apparatus or machines used from the point where the fiber-containing stalks are introduced into the apparatus to the point where extracted and completely cottonized fibers leave the apparatus. The raw fiber-containing stalks are placed on a feed table $a$ whence they pass through several pairs of rotating stalk-breaking rolls $b$ provided with longitudinal grooves or intermeshing teeth. In passing through these pairs of rolls the stalks are decorticated or have their wood or dross broken off them. From the last pair of decorticating rolls $b$ the fiber containing material passes over a series of spiked rolls $c$, the speed of each succeeding roll $c$ being greater than that of the previous one so that, besides passing the material on, it combs the fibers, lays them parallel to each other and frees them of shives or dross. A spiked drum $d$ takes the material from the last roll $c$ and in winding it round forms it into a fleece. Arranged above and beneath the spiked drum $d$ are bar grids $e$ which strip and remove the woody fragments from the fibrous material. An intermittently operating spiked drum $f$ takes the fibrous material from the spiked drum $d$ and passes it on to a pair of toothed rolls $g$ which feed it on to an endless conveyor belt $h$ that conveys the material to a boiling vat or cooker. The cooker consists of an open boiling vessel m which may be built of iron or other metal, or of wood, brick or the like. Arranged at the top and bottom of the boiling vessel are rolls l which act as guide members for a pair of reticulated endless conveyor belts i, k. These belts come together at the first top roll l and diverge from each other again at the last top roll after they have passed down and up a number of times through the water or liquid in the boiling vessel or tank. Both belts i, k eventually pass over rolls n whence they return to their starting points.

The fibrous material is delivered by the conveyor belt h to the bottom belt i of the boiler and is carried up and down between the belts i, k over the rolls l in the cooker or boiler and at the end of the latter it passes from the bottom belt i out of the boiler and is delivered to another endless belt o. In the boiler the fibrous material is treated with water or chemical solution, such as alkali at ordinary atmospheric pressure and at any suitable temperature up to about 100° Celsius. By causing the material to traverse an up-and-down zig-zag path between the rolls l it is made to remain a considerable time in the boiler so that a sufficiently long and intense action of the boiling liquid on the fibrous material is obtained. This action is assisted by the fact that, at each roll l where the motion of the pair of belts i, k is changed from up to down or vice versa, these belts are pressed firmly together so as to thoroughly squeeze the fibrous material. Consequently, in addition to the chemical action of the alkaline liquid, an intense mechanical action is obtained by the alternate wringing out and absorption of the liquid in the fibrous material whereby a completely uniform and thorough opening of the fibrous material is secured, which was not possible in the boiling apparatus employed hitherto which consisted of an open or closed boiler into which the material was simply packed. In a boiler of this latter kind, where the material is kept practically motionless while boiling, some portions of the material are opened and others are not, so that the product is liable to be very non-uniform.

By lengthening the pair of kneading belts i, k and increasing the number of rolls l, or by arranging a number of such boiling vats in series the size of the vats and the duration of the boiling operation may be prolonged at will.

The fibrous material issuing from the boiling vat or vats is fed into a beating machine through which it is carried by an endless belt o over a table p provided with wooden crossbeams on which the material is beaten by hammers or rams s. The rams s are raised and allowed to drop by cams r. Arranged between the rams are squirting pipes g, from which water or chemical solution is ejected onto the travelling fibrous material. The object of the beating machine is to subject the material to a further intense mechanical action and simultaneously to a thorough, powerful washing effect.

The conveyor belt o passes the fibrous material from the beating machine to a staple machine the object of which is to separate or divide the fibers in the now opened fibrous material into fiber elements of a certain uniform length or staple. The fibrous material is seized by the first pair of toothed rolls $t^1$ and then passes on to the succeeding pairs of rolls $t^2$, $t^3$, $t^4$. As each pair of toothed rolls rotates faster than the anteceding pair the fiber elements are pulled apart and freed from their companion elements and a completely uniform wool or fleece is obtained whose individual fibers have the length of the natural fiber elements contained in the stalks which, in the case of flax and hemp, is about equal to the length or staple of cotton. The rolls of each pair $t^1$, $t^2$, $t^3$, $t^4$ are pressed together by helical springs u so that the fibrous material is firmly held and prevented from slipping in passing through a pair of rolls.

After the drawing or separating operation in the pairs of drawing rolls $t^1$, $t^2$, $t^3$, $t^4$ the fibrous material is conveyed from the last pair $t^4$ by a belt conveyor v and carried through a washing apparatus in which it is again thoroughly washed by powerful water jets that issue from squirting pipes w. When the washed and finished product reaches the belt guiding roll z it is thrown off the belt v and it may be fed from that point into a bleaching and washing apparatus which may consist of a device that is similar to the open boiling vessel or vat m except that it is divided into a number of compartments. The length of the first compartment is such that the fibers are conveyed up and down through an acid solution for about 8 or 10 minutes whereupon they are passed through a succeeding short section of vat containing water for washing them. Then the fibers pass into another section of vat containing a chlorine solution through which they pass for about 15–20 minutes. Then they are passed into another short section of vat where they travel up and down in a zig-zag path in acid solution for about 2 minutes, whereupon they enter another short vat through which they travel in water for about 2 minutes, and they finally pass through a section of vat containing a soap solution through which they travel for about 2 minutes. By bleaching the fibers in this way the entire bleaching process is accomplished in about half an hour instead of taking several hours as hitherto. The fibers which have now been bleached and thoroughly cleaned pass automatically into centrifugal or other moisture extractors, drying apparatus or automatic belt dryers or the like by which all moisture is removed and the fibers are thoroughly dried.

The durations of treatment stated herein are, however, only given as examples and not intended to define the scope of the invention.

Before or after the fibers are dried they may be passed automatically as by belt conveyers through drying apparatus.

The fiber fleece obtained in this way is perfectly clean and uniform. The individual fibers are of a uniform length equal to that of the natural fiber element in the plant and they can be fed directly into spinning machines. They may be spun alone or mixed with cotton in ordinary two-cylinder or three-cylinder cotton spinning machines and yarns up to No. 24 and higher English counts can be spun with them. The cottonized fiber may, if desired, be mixed with other fiber such as wool.

We claim:—

1. Apparatus for extracting fibers from plant stalks and dividing the fibers into their natural individual elements comprising pairs of intermeshing toothed rolls for breaking the woody substance of the plant stalks, revolving spiked bodies for combing and deshiving the fibers from which the woody substance has been loosened by said toothed rolls, an open vat containing hot liquid for softening the gluey matter in the fibers, conveyor belts for conveying the fibers from said spiked bodies to said vat and in a zig-zag path through the liquid in said vat, anvils and a hammer for each anvil for beating the fibers, liquid jets between the hammers, pairs of stretching rolls each of which has a higher peripheral speed than the preceding pair, a conveyor belt for conveying the fibers from said hot liquid vat to said hammers and liquid jets and then to the first pair of said stretching rolls, finishing liquid jets for washing the individual fiber elements, into which the fibers are divided by said stretching rolls, and a reticulated conveyor belt for conveying the fiber elements from the last pair of stretching rolls past said finishing jets 2. Apparatus for extracting fibers from plant stalks and dividing the fibers into their natural individual elements comprising pairs of intermeshing toothed rolls for breaking the woody substance of the plant stalks, revolving spiked bodies for combing and deshiving the fibers from which the woody substance has been loosened by said toothed rolls, an open vat containing hot liquid for softening the gluey matter in the fibers, a conveyor belt for conveying the fibers from said spiked bodies to said vat, sets of guide rolls at the top and bottom of said open vat and intercontacting fiber-conveying belts travelling up and down through the hot liquid in the vat and over said guide rolls, anvils and a hammer for each anvil for beating the fibers, pairs of intermeshing stretching rolls each of which has a higher peripheral speed than the preceding pair, a conveyor belt for conveying the fibers from said hot liquid vat to said hammers and liquid jets and then to the first pair of said stretching rolls, finishing liquid jets for washing the individual fiber elements, into which the fibers are divided by said stretching rolls, and a reticulated conveyor belt for conveying the fiber elements from the last pair of stretching rolls past said finishing jets 3. Apparatus for extracting fibers from plant stalks and dividing the fibers into their natural individual elements comprising pairs of intermeshing toothed rolls for breaking the woody substance of the plant stalks, revolving spiked bodies for combing and deshiving the fibers from which the woody substance has been loosened by said toothed rolls, a spiked drum for forming the combed fibers into a fleece, an open vat containing hot liquid for softening the gluey matter in the fibers, conveyor belts for conveying the fiber fleece from said drum to said vat and in a zig-zag path through the liquid in said vat, anvils and a hammer for each anvil for beating the fibers, pairs of stretching rolls each of which has a higher peripheral speed than the preceding pair, a conveyor belt for conveying the fibers from said hot liquid vat to said hammers and liquid jets and then to the first pair of said stretching rolls, finishing liquid jets for washing the individual fiber elements, into which the fibers are divided by said stretching rolls, and a reticulated conveyor belt for conveying the fiber elements from the last pair of stretching rolls past said finishing jets.

4. An apparatus for extracting fibers from plant stalks and dividing the fibers into their natural individual elements comprising pairs of intermeshing toothed rolls for breaking the woody substance of the plant stalks, revolving spiked bodies for combing and deshiving the fibers from which the woody substance has been loosened by said toothed rolls, an open vat containing hot liquid for softening the gluey matter in the fibers, conveyor belts for conveying the fibers from said spiked bodies to said vat and in a zig-zag path through the liquid in said vat, anvils and a hammer for each anvil for beating the fibers, liquid jets between the hammers, pairs of stretching rolls each of which has a higher peripheral speed than the preceding pair, a reticulated conveyor belt for conveying the fibers from said hot liquid vat to said hammers and liquid jets and then to the first pair of said stretching rolls, finishing liquid jets for washing the individual fiber elements, into which the fibers are divided by said stretching rolls, and a reticulated conveyor belt for conveying the fiber elements from the last pair of stretching rolls past said finishing jets.

5. Apparatus for extracting fibers from plant stalks and dividing the fibers into their natural individual elements comprising pairs of intermeshing toothed rolls for breaking the woody substance of the plant stalks, revolving spiked bodies for combing and deshiving the fibers from which the woody substance has been loosened by said toothed rolls, an open vat containing hot liquid for softening the gluey matter in the fibers, a conveyor belt for conveying the fibers from said spiked bodies to said vat, sets of guide rolls at the top and bottom of said open vat and intercontacting fiber conveying belts travelling up and down through the hot liquid in the vat and over said guide rolls, anvils and a hammer for each anvil for beating the fibers, pair of intermeshing stretching rolls each of which has a higher peripheral speed than the preceding pair, a reticulated conveyor belt for conveying the fibers from said hot liquid vat to said hammers and liquid jets and then to the first pair of said stretching rolls, finishing liquid jets for washing the individual fiber elements, into which the fibers are divided by said stretching rolls, and a reticulated conveyor belt for conveying the fiber elements from the last pair of stretching rolls past said finishing jets.

In testimony whereof we have affixed our signatures.

BRUNO POSSANNER von EHRENTHAL.
KARL SCHOLZ.